United States Patent [19]

Chang et al.

[11] Patent Number: 6,137,896

[45] Date of Patent: Oct. 24, 2000

[54] METHOD OF RECOGNIZING FACES USING RANGE IMAGES

[75] Inventors: Shoude Chang, Gloucester; Marc Rioux, Ottawa, both of Canada

[73] Assignee: National Research Council of Canada, Ottawa, Canada

[21] Appl. No.: 08/944,954

[22] Filed: Oct. 7, 1997

[51] Int. Cl.$^7$ .................................................. G06K 9/00
[52] U.S. Cl. ........................................ 382/118; 382/211
[58] Field of Search ........................... 382/118, 124–127, 382/191, 210, 211, 280, 283, 278; 340/825.34; 356/71, 394; 349/17; 324/76.33

[56] References Cited

U.S. PATENT DOCUMENTS

| 4,826,285 | 5/1989 | Horner | 350/162.13 |
| 5,276,636 | 1/1994 | Cohn | 364/822 |
| 5,724,447 | 3/1998 | Fukushima | 382/211 |
| 5,878,157 | 3/1999 | Mukohzaka | 382/124 |
| 5,995,639 | 11/1999 | Kado et al. | 382/118 |

OTHER PUBLICATIONS

Thomas Vetter, Recognizing Faces From A New Viewpoint, IEEE publication, pp. 143–146, 1997.
Yasunori Nagasaka et al., Discrimination Among Individuals Using Orthogonal Transformed Face Images, IEEE publication, pp. 175–179, Sep. 1997.
David Beymer et al., Face Recognition From One Example View, IEEE publication, pp. 500–507, Aug. 1995.
Takashi Nagamine, 3D Facial Image Analysis for Human Identification, IEEE publication, pp. 324–327, 1992.
John C. Lee et al., Matching Range Images of Human Faces, IEEE publication, pp. 722–726, Aug. 1990.
T. Abe et al., Automatic Identification of Human Faces from 3–D Data Using Vertices of B–Spline Surface, Conference Proceedings, Artificial Intelligence in the Pacific Rim, pp. 575–580, 1991.
Benjamin Miller, Vital Signs of Identity, IEEE Spectrum, vol. 31, Issue 2, Feb. 1994.
M.S. Lew et al., Intermediate Views for Face Recognition, Proceedings of 6th International Conference on Computer Analysis of Images and Patterns, CAIP 95, Springer–Verlag, Berlin, Germany, pp. 138–145, Sep. 1995.

*Primary Examiner*—Leo H. Boudreau
*Assistant Examiner*—Brian P. Werner
*Attorney, Agent, or Firm*—Neil Teitelbaum & Associates

[57] ABSTRACT

Faces are one of the most commonly recognized features among people. According to the invention a system for recognizing intensity images of faces is provided. Intensity images of a face are captured and normalized. The intensity images are transformed, filtered and then transformed again. The filter is based on a three-dimensional image of a face against which the intensity image is being compared. The result is a form of correlation that is substantially illumination independent.

21 Claims, 18 Drawing Sheets

METHOD OF RECOGNIZING FACES USING RANGE IMAGES

FILED OF THE INVENTION

This invention relates generally to facial recognition and more specifically to matching a two dimensional range image of a face to a three dimensional image of a face.

BACKGROUND OF THE INVENTION

The face is a distinct, if not unique, identification of a person. Face recognition is a natural ability of human beings. It was reported by S. J. Thorpe in "Traitement d'images par la systeme visuel de I'homme" (Actes du Colloque TIPI 8 8, pp–LX–I–IX–12, Aussois, Avril 1988) that there exists a specific cortex area in the human brain to perform this task. As a personal identifier, among fingerprint, hand geometry and retinal pattern, the facial identifier has the highest social acceptability. Therefore, the automatic recognition of human faces is emerging as an active research area. Two good surveys are contained in the work of A. Samal and P. Iyengar, "Automatic recognition and analysis of human faces and facial expressions: A survey" (Patt. Recog., vol. 25, pp–65–77, 1992) and R. Chellapa, C. L. Wilson and S. Sirohey, "Human and machine recognition of faces: A survey" (Proceeding of IEEE, vol. 83, pp.705–740, 1995). These surveys outline a current state of the art.

Most of the existing methods need to extract features, such as structural features, transform coefficient features, templated features. Based on these features, the recognition is then performed basically by means of one of two known approaches: statistical and neural network. Though these methods have shown considerable promise, they both suffer from several disadvantages. In both cases, significant training is required. Both approaches are somewhat lighting sensitive and much of the training is to account for lighting differences between stores features and those captured for recognition. Thus far, due to complexity and reliability, systems employing these approaches have not received widespread acceptance.

In face recognition applications, range imaging provides significant advantages since it contains richer and more accurate shape information than that captured in two-dimensional intensity images. An early approach to identifying facial images using range images compares two profile planes obtained from two separate range images of faces; this was reported by [25] T. Y. Cartoux, J. T. Lapreste and M. Richentin in "Face authentification or recognition by profile extraction from range images" (Proc.: IEEE, Computer Soc. Workshop on Interpretation of 3D Scenes, 1989, Austin, Tex., pp. 194–199). Unfortunately, such a compression is based on only a small portion of facial information.

J. C. Lee and E. Milios disclose an approach using convex regions of a range face in an article "Matching range images of human faces" (Proc. IEEE Soc. 3d Int. Conf. On Computer Vision, 1990, pp.722–726). The regions are segmented and then represented by an extended Gaussian image, which is invariant to scale and orientation changes. To identify two faces, a matching algorithm is used. The algorithm appears to work as intended. Unfortunately, for most facial recognition operations, scale independence is of little value. Changes in orientation are often minimal since a face is most often upright and images are usually captured under controlled conditions.

T. Abe, H. Aso and M. Kimara in "Automatic Identification of human faces by 3-D shape of Surface—using vertices of B-Spline surface" (System and Computers in Japan, vol. 22, No.7, pp.96–105, 1991) disclose a method wherein vortices of a B-Spline surface are used as feature vector components for range face identification. Gordin in "Face recognition based on depth maps and surface curvature" (SPIE Proc.: Geometric Methods in Computer Vision, vol. 1570, 1991) describes a curvature based recognition system. A range image is obtained from a rotating scanner and stored in a cylindrical coordinate system. Surface descriptors are calculated from local curvature values, and comparisons between the descriptors of two faces is used for the identification. Systems of this type are useful when a plurality of range images of individuals are already accessible. Currently, most databases of facial images comprise two-dimensional face images.

It would be advantageous to provide a method of comparing two-dimensional facial images and three-dimensional facial images.

A major problem in comparing range images and two-dimensional intensity images is illumination. Two two-dimensional intensity images may appear very differently when illumination is different. Shadows act to obscure features and to limit recognition. Vastly different images result by modifying illumination. Conversely, range images have no illumination component and, therefore, are unaffected by illumination. That said, comparing a range image and a two-dimensional intensity image by rendering a two-dimensional image with illumination in order to match illumination of the intensity image is impracticable as a large number of images are rendered before the illumination substantially matches and a comparison is possible.

Thus, in an attempt to overcome these and other limitations of known prior art devices, it is an object of this invention to provide a method of performing facial recognition that is substantially independent of illumination.

SUMMARY OF THE INVENTION

In accordance with the invention, there is provided a method of comparing a three-dimensional facial image and a two-dimensional facial image. The method comprises the steps of:

providing an electronic representation of a two-dimensional intensity image;

providing information derived from a three-dimensional image;

performing a correlation based on a transform of at least one of the two-dimensional intensity image and the three-dimensional image, correlation results partially illumination independent;

when the correlation results are within a first range, providing an indication.

According to an embodiment, the correlation results are substantially illumination independent.

According to another aspect of the invention, there is provided a system for performing facial recognition comprising:

means for providing a two-dimensional facial image;

means for transforming the image in a predetermined fashion;

means for filtering the transformed image in dependence upon a known three-dimensional image;

means for transforming the filtered transformed image to produce a result indicative of a correlation between the provided facial image and the known three-dimensional image.

In an embodiment, the system the means for providing a two-dimensional facial image comprises image capture means for capturing a first image and for providing a first signal dependent upon the captured image; and, the means for transforming the image, the means for filtering the transformed image, and the means for transforming the filtered transformed image comprise at least a processor for receiving the first signal and for applying a transform to the first signal, for filtering the transformed first signal, the filter determined in dependence upon a three-dimensional image and for applying an inverse of the transform to the filtered transformed first signal.

According to an embodiment the system for performing facial recognition comprises a light source for providing a beam of light;

a filter for filtering the beam of light, the filter for receiving a first signal and for filtering in dependence thereon, and the means for providing a two-dimensional facial image comprises image capture means for capturing a first image and for providing the first signal in dependence thereon;

the means for transforming the image in a predetermined fashion comprises a lens for receiving the filtered beam of light and for transforming the beam of light in a predetermined fashion;

the means for filtering the transformed image in dependence upon a known three-dimensional image comprises a second filter for filtering the beam of light, the second filter for receiving a second signal in dependence upon a known three-dimensional image and for filtering in dependence thereon; and the means for transforming the filtered transformed image to produce a result indicative of a correlation between the provided facial image and the known three-dimensional image comprises a lens for receiving the filtered transformed beam of light and for transforming the beam of light in substantially an inverse fashion to the predetermined fashion.

BRIEF DESCRIPTION OF THE DRAWINGS

Exemplary embodiments of the invention will now be described in conjunction with the following drawings, in which.

DETAILED DESCRIPTION

According to the invention, a phase-only filter is applied to a facial image for comparison. It has been found that discrimination provided by the phase-only filter used in range image recognition is satisfactory. The phase-only correlation is also applicable in comparing range facial images and intensity facial images using a phase-only vector filter which is derived from surface normals of a reference range facial image. The correlation value represents the identification result between the reference range facial image and the input intensity facial images. The recognition process according to the invention is illumination insensitive.

In the optical recognition fields, the concept of phase-only filters is widely used in matched filters as shown by J. L. Homer and P. D. Gianin in "Phase-only Matched filter" (Appl. Opt., vol. 23, pp.812–818, 1984) and joint-transform correlators as shown by S. Chanc,, S. Boothroyd and S. Pachanathan in "Rotation-invariant pattern recognition using joint-transform correlator" (Optics Communications) due to high discrimination and good peak performance. Further using an FFT algorithm, this method is easily implemented in the digital domain.

2. Shading From Surface Normal

A range image presents a three-dimensional surface, which can be expressed as $$z=f(x,y). \qquad (1)$$

For every point on the surface there is a unique vector normal thereto. An equation for the normal vector is $$\frac{x-x_0}{f'_{x_0}} = \frac{y-y_0}{f'_{y_0}} = \frac{z-z_0}{f'_{z_0}} \qquad (2)$$

where $f'_{x_0}$, $f'_{y_0}$, $f'_{z_0}$ are the values $\partial f/\partial x$, $\partial f/\partial z$, at the point $(x_0, y_0, z_0)$, respectively.

A normal vector n can be expressed as $$n=n_x i+n_y j+n_z k \qquad (3)$$

where i, j, k are unit vectors parallel to an x, y, and z axis, respectively. A normal vector function of a range image is defined as $$f_n(x,y)=f_x(x,y)i+f_y(x,y)j+f_z(x,y)k \qquad (4)$$

Figure 1:
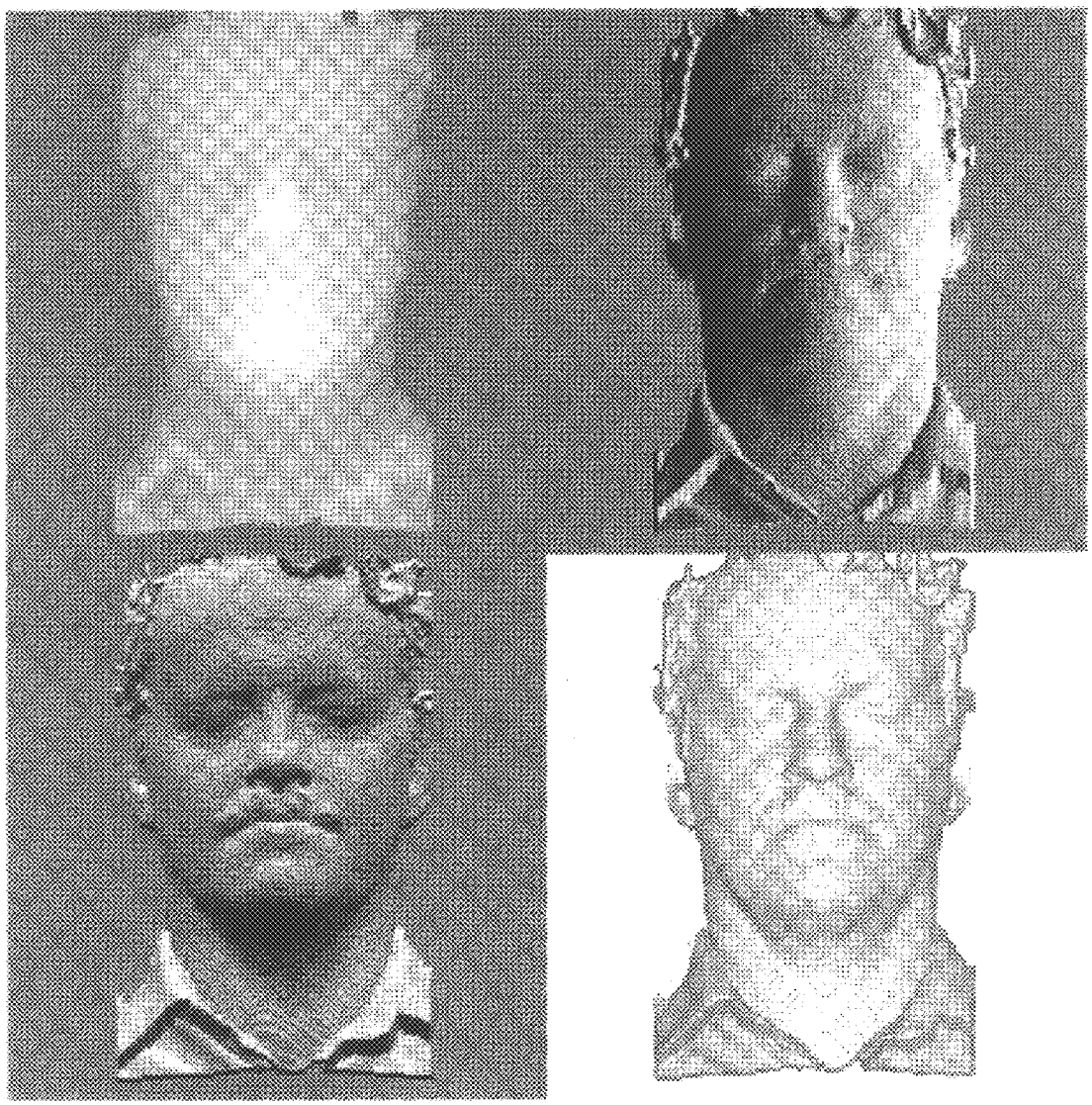
FIG. 1 shows a facial range image in the top-left and its three normal components—a component parallel to an x axis (top-right); a component parallel to an y axis (bottom-left); a component parallel to an z axis (bottom-right)

Each component—$f_x$, $f_y$, and $f_z$—forms a two-dimensional image. FIG. 1 shows a a range image of a face, a facial range image, and its three normal components. The function $f_n(x,y)$ represents the orientation of a facet at point (x,y) on the surface $f(x,y)$. Since the range image provides a three-dimensional surface, the resulting normal vector extends from the surface perpendicular thereto in three-dimensional space. As such, the normal vector is easily modeled by three orthogonal vectors which, when summed, form the normal vector; each orthogonal vector is referred to as a component vector. Each component image—image formed by some component vectors—is shown as an intensity image but is more accurately described as an array of parallel component vectors.

Figure 2:
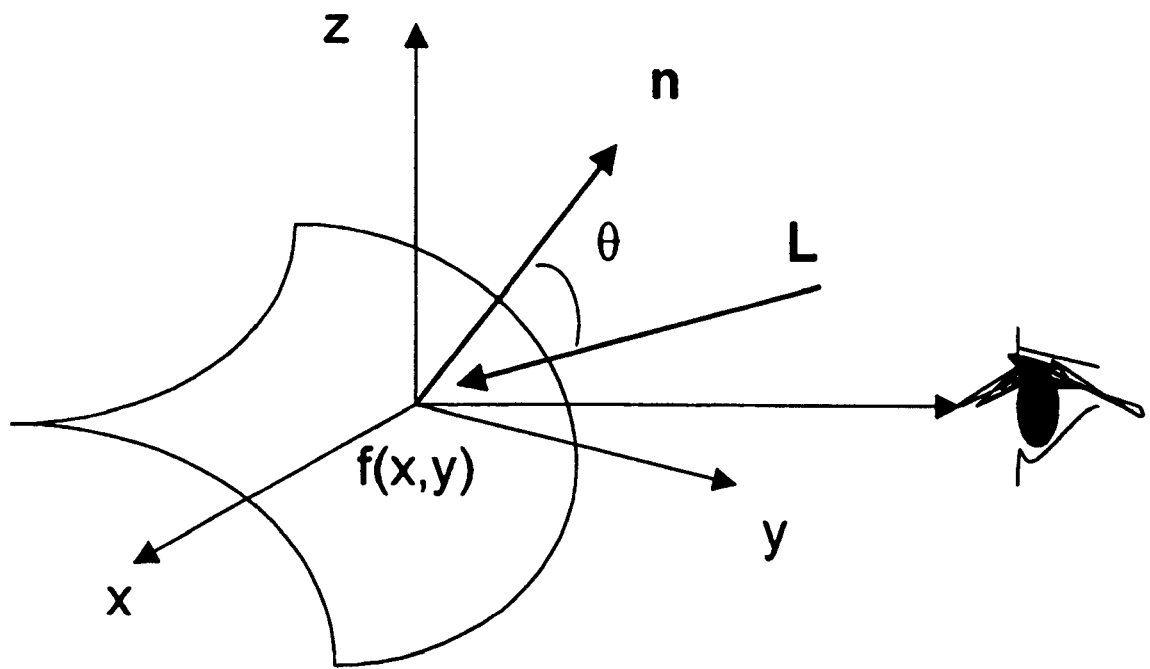
FIG. 2 is a simplified diagram showing Lambertian reflectance.

Let an illumination function be $$L=l_x i+l_y j+l_z k \qquad (5)$$

according to Lambertian reflectance assumption as disclosed by. S. Lew, A. C. She and T. S. Huang in "Intermediate views for face recognition" (Proc.: 6h Computer Analysis of Images and Patterns, CAIP'95, 1995, pp. 138–145), the rendering function s(x,y) of the surface $f(x,y)$ is an inner product of the illumination function and normal function:

$$s(x,y)=L \cdot f_n=|L|\cdot|f_n|\cos\theta=l_x f_x+l_y f_y+l_z f_z \qquad (6)$$

as is evident from the diagram of FIG. 2.

Figure 3:
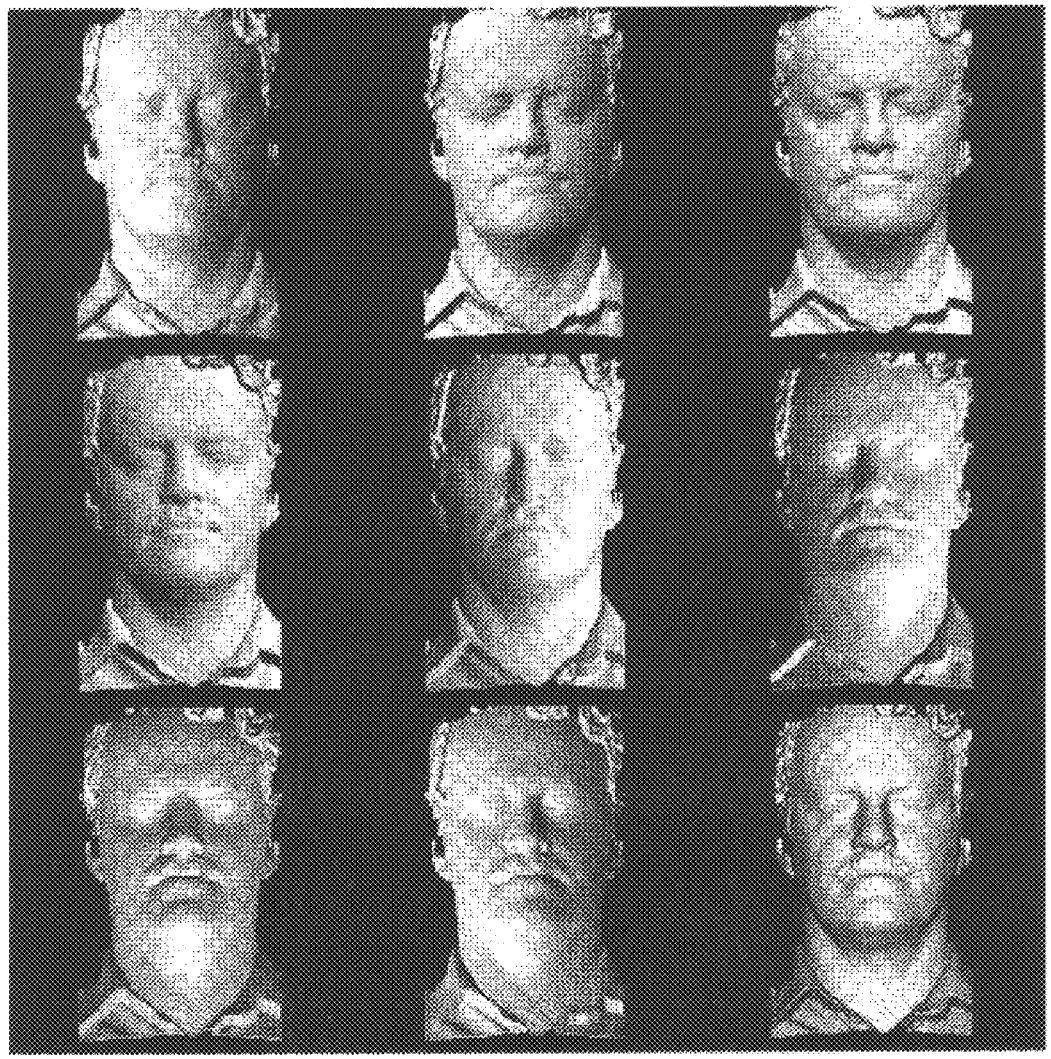
FIG. 3 shows nine rendered images of faces derived from the facial range image of FIG. 1 with each of the nine images having a different illumination component.

Signs and Values of $l_x$, $l_y$, and $l_z$ are necessary to determine a visual effect of a range surface $f(x,y)$. With this view, an intensity face image is approximated by a sum of three weighted normal component images derived from a range image, with the weighting factors $l_x$, $l_y$, and $l_z$. FIG. 3 shows a set of rendered images of faces composed of same component images but with different illumination weight factors.

A range image contains more shape information than that in an intensity image. Generally, an intensity image is obtainable from a range image, but no accurate range image is obtainable from an intensity image; however, from FIGS. 1 and 3, it is interesting to note that intensity images as rendered provides a more vivid visual effect than that of a range image. This is due in part to human perception and in part to a format of display of the range images.

3. Phase-Only Vector-Filter and Vector-Correlation

3.1 Phase-Only Correlation Between Facial Range Images

Let a two dimensional image be represented by $f(x,y)$, and its Fourier transform be represented by $$F(u, v)FFT[f(x, y)]=|F(u, v)|exp[j\phi(u,v)]\cdot \qquad (7)$$

The Phase-only filter is defined as $$P(u,v)=F(u,v)/|F(u,v)|=exp[j\phi(u,v)]\cdot \qquad (8)$$

For traditional autocorrelation represented by $f(x,y) \otimes f(x,y)$, a resulting power spectrum is $$C(u,v)=F(u,v)F^*(u,v)=|F(u,v)|^2 \qquad (9)$$

where * denotes a conjugate operation. For the phase-only autocorrelation, the equation for the power spectrum is $$C(u,v)=F(u, v)P^*(u,v)=|F(u,v)|\cdot \qquad (10)$$

Because $|F(u,v)|$ has a more flat distribution than $|F(u,v)|^2$, a peak of the phase-only autocorrelation is much sharper than that resulting from traditional autocorrelation. A sharper peak desirable because it is more easily distinguishable from other results indicative of other than autocorrelation. This allows for matching of substantially same images more reliably.

Figure 4:
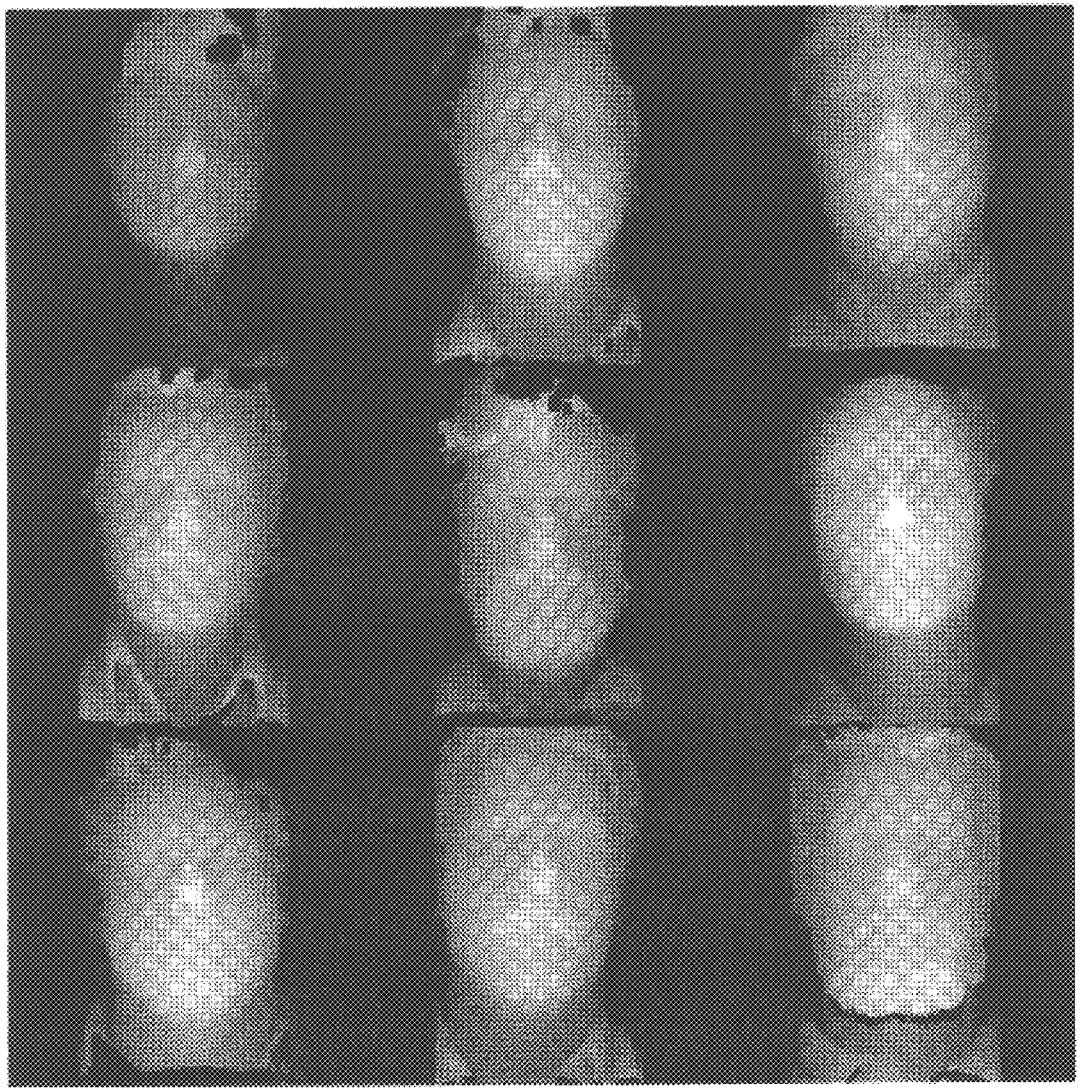
FIG. 4 shown nine facial range images of nine people.
Figure 5:
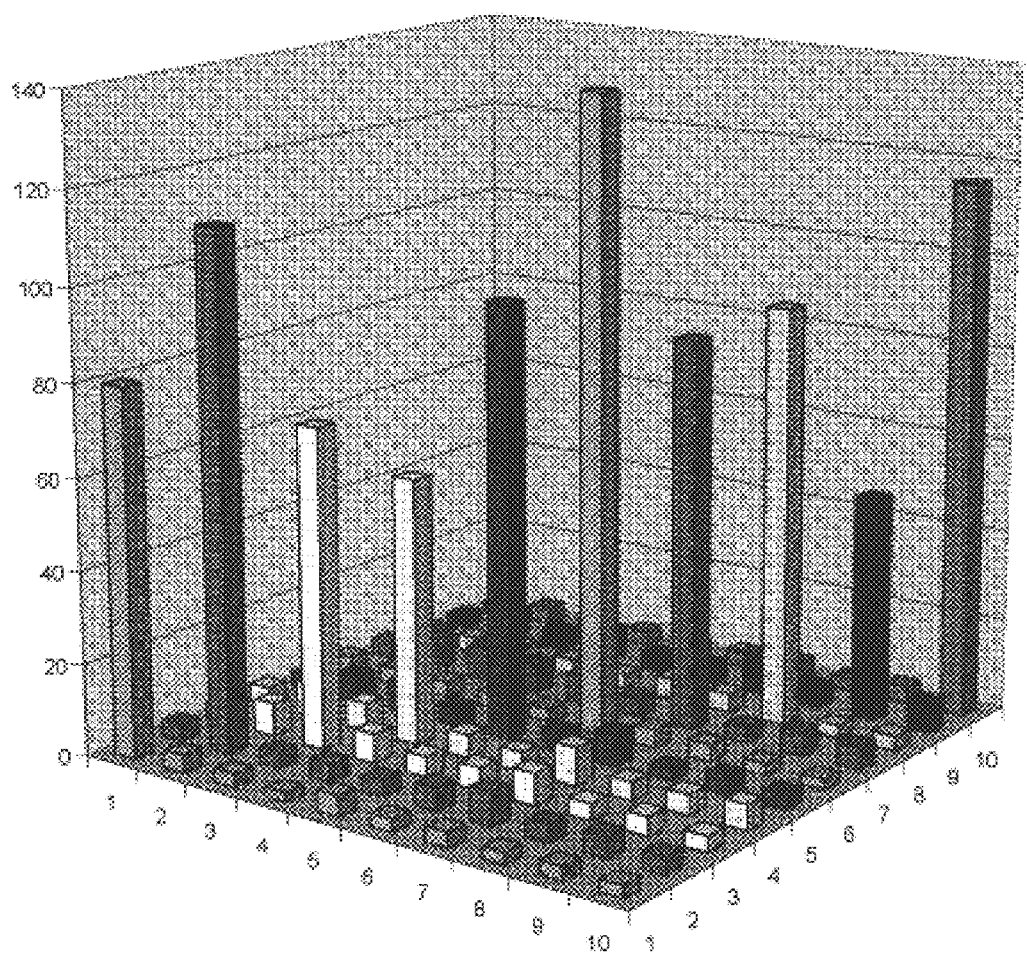
FIG. 5 shown results of phase-only correlations between the 10 facial range images with autocorrelation results shown along a diagonal.

According to the invention, a phase-only filter is used in the recognition of facial images. During testing, 10 facial range images were used, one shown in FIG. 1 and nine shown in FIG. 4. 100 phase-only correlations were carried out—each image was correlated with the 10 other images. FIG. 5 illustrates by way of a bar-graph the values of the correlation intensities. The bars on the diagonal are auto-correlations and are clearly much sharper and taller peaks than the remaining bars. The phase-only filter yields good discrimination among these 10 facial range images.

3.2 Vector-Correlation Between Facial Range Images and Rendered Intensity Images of Faces Equation (6) denotes that a rendered image is determinable from a range image. It has been found that, according to the invention, facial recognition is performed between facial range images and rendered images of faces. The facial range image is provided as a reference image and is stored. For testing, rendered images were provided as input images. Modeling the input images was performed as follows $$s^i(x,y)=l_x f^i_x+l_y f^i_y+l_z f^i_z, \qquad (11)$$

and the normal vector of the reference image was modeled as follows $$f^r_n(x,n)=f^r_x(x,y)i+f^r_y(x,y)j+f^r_z(x,y)k- \qquad (12)$$

three component phase-only filters being $$P_x=f^r_x(x,y)/|f^r_x(x,y)|$$
$$P_y=f^r_y(x,y)/|f^r_y(x,y)|$$
$$P_z=f^r_z(x,y)/|f^r_z(x,y|\cdot$$

Then a vector-filter is defined as $$P=P_x(x,y)i+P_y(x,y)j+P_z(x,y)k. \qquad (13)$$

$$\text{When } IFT[P]=p=p_x(x,y)i+p_y(x,y)j+p_z(x, y)k \qquad (14)$$

where IFT [·] denotes the inverse Fourier Transform, the vector-correlation between p and the rendered image $s^i(x,y)$ is $$c=p\otimes s^i=c_x i+c_y j+c_z k=p\otimes \iota_x f_x^{'i}+p\otimes \iota_y f_y^{'i}+p\otimes \iota_z f_z^{'i}. \qquad (15)$$

For the first item, $$c_x=[p_x(x,y)i+[p_y(x,y)j+[p_z(x,y)k\otimes \iota_x f^i_x=p_x\otimes \iota_x f^i_x i+\\p_y\otimes \iota_x f^i_x j+p_z\otimes \iota_x f^i_x k \qquad (16)$$

When the input is identified as the reference, the first item in Equation (16) yields a significant strong peak and other items are substantially insignificant; stated mathematically, $$c_x \approx p_x(x,y)\otimes \iota_x f^i_x$$

and similarly, $$c_y \approx p_y(x,y)\otimes \iota_y f^i_y, \; c_z \approx p_z(x,y)\otimes \iota_z f^i_z.$$

The vector correlation is $$c=c_x i+c_y j+c_z k \approx p_x(x,y)\otimes \iota_x f^i_x i+p_y(x,y)\otimes \iota_y f^i_y j+\\p_z(x,y)\otimes \iota_z f^i_z k \qquad (17)$$

and the intensity of c, the correlation, is $$|c|^2=|c_x|^2+|c_y|^2+|c_z|^2 \approx |p_x(x,y)\otimes \iota_x f^i_x|^2+|p_y(x,y)\otimes \iota_y f^i_y|^2+\\|p_z(x,y)\otimes \iota_z f^i_z|^2 = \iota_x^2|p_x(x,y)\otimes f^i_x|^2+\iota_y^2|p_y(x,y)\otimes f^i_y|^2 \qquad (18)$$

When energy in the illumination is conservative, i.e. the factors in Equation (5) meet $1_x^2+1_y^2+1_z^2$=constant, Equation (18) suggests that the intensity of the correlation is less sensitive, if not invariant, to changes of illumination. This result is the same even though these changes, particularly the changes of signs of the factors, greatly change the visual appearance of the intensity image.

4. Face Recognition

4.1 The Normalization of the Input

Preferably, all input facial images are normalized prior to the step of correlation. A method of normalising an input image is as follows:

$$s_n(x, y)=ks_i(x, y) \qquad (19)$$

where k is a normalizing coefficient. A consideration is given by making the energy in $s_n(x,y)$ equal to that in the reference, i.e., $$k=mean(f_r)/mean(s_i), \qquad (20)$$

where mean($f$) is a mean of the reference from which the vector-filter was derived.

Since the phase-only filter is only sensitive to high frequency components and a DC component changes the mean of si in an embodiment, variance of an image is chosen as the normalisation standard. Hence we have $$k=var(f_r)/var(s_i) \qquad (21)$$

where var($f$) is the variance of $f$. Of course, other different normalisation standards may also be applied.

4.2 Phase-Only Vector Correlation Between Range Face and Rendered Face

Figure 6:
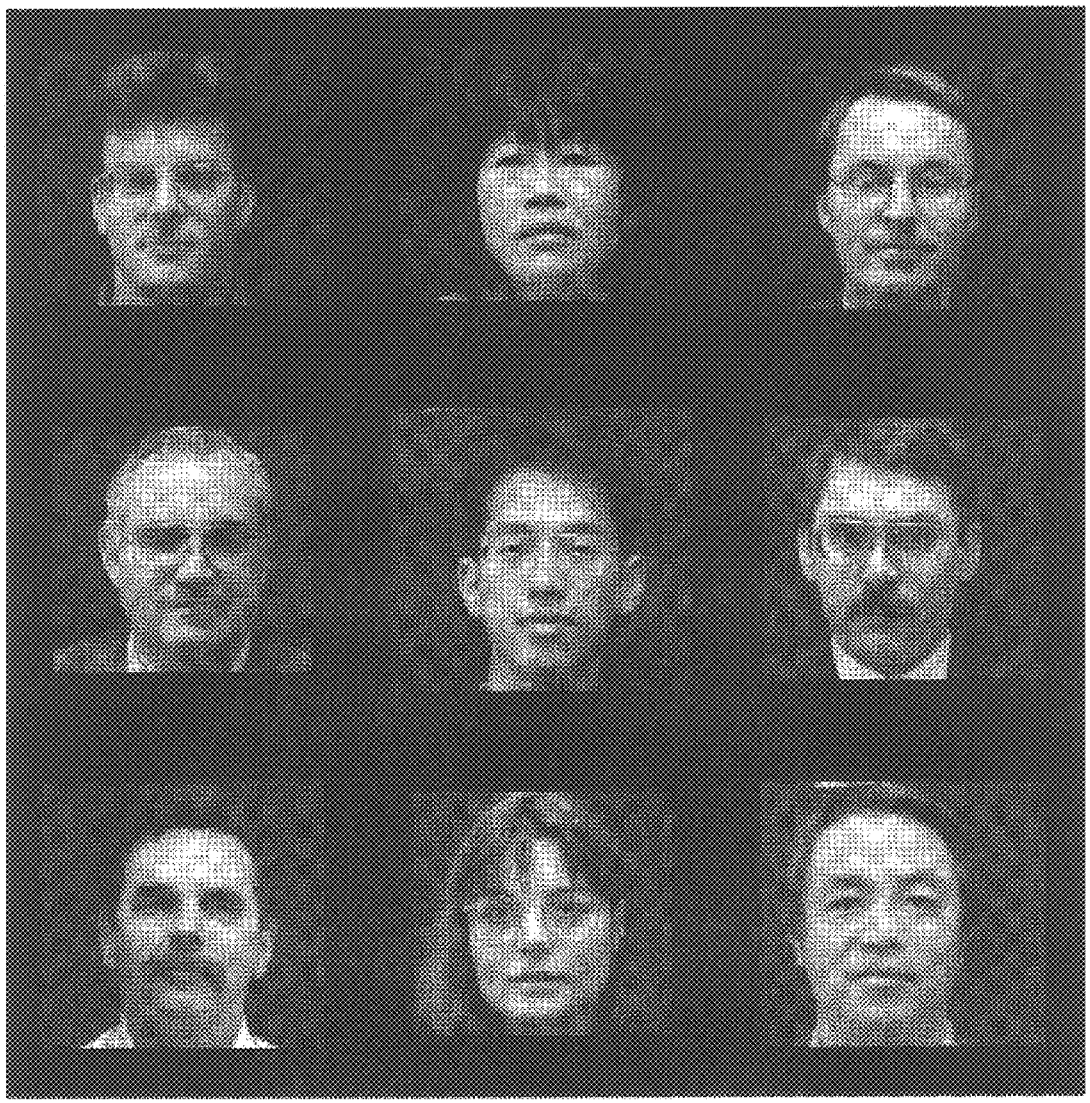
FIG. 6 shown nine rendered images of faces based on the nine facial range images of FIG. 4.
Figure 7:
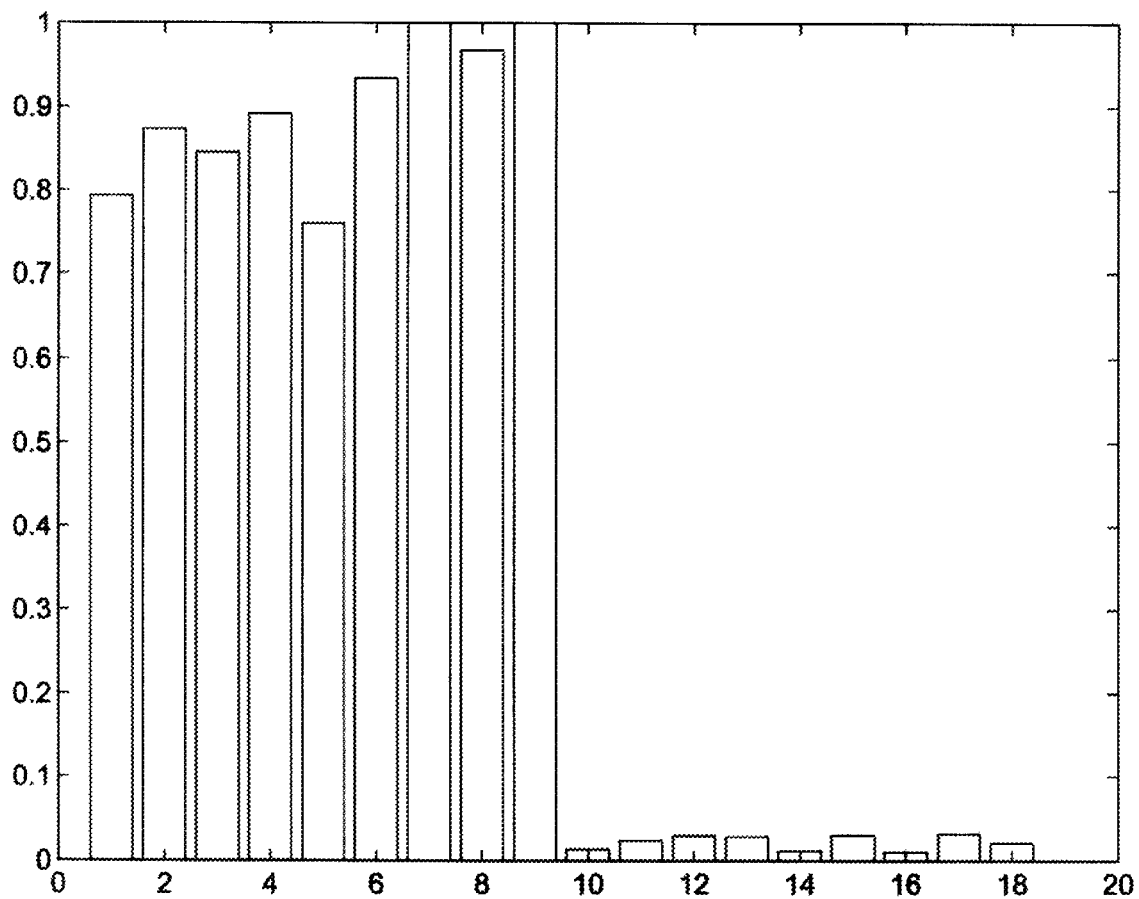
FIG. 7 shows a bar graph of intensities of vector-correlations between a reference facial range image (FIG. 1, top-left) and rendered images of faces shown in FIG. 3 (numbered 1–9 in this figure) and FIG. 6 (numbered 10–18 in this figure)

The facial range image in a top-left location of FIG. 1 was provided as a reference image and a vector-filter was derived from it. Nine rendered images of faces shown in FIG. 3 and another nine rendered images of faces shown in FIG. 6 were provided as input images. All the input images were normalized following Equation (21). Each image was then transformed using a Fourier transform, filtered with a phase-only filter, and retransformed using an inverse Fourier transform. A correlation result is extracted from the retransformed data. In FIG. 7 a bar-graph of intensities of 18 vector-correlations, one for each image, are illustrated. A correct classification is achieved by setting a threshold above which a peak indicates a match. Although illumination changes are evident in the 18 rendered images, autocorrelation peaks change substantially less and keep a remarkable height over cross-correlation peaks. Essentially, by setting an appropriate threshold, the correlations are illumination independent.

Figure 8A:
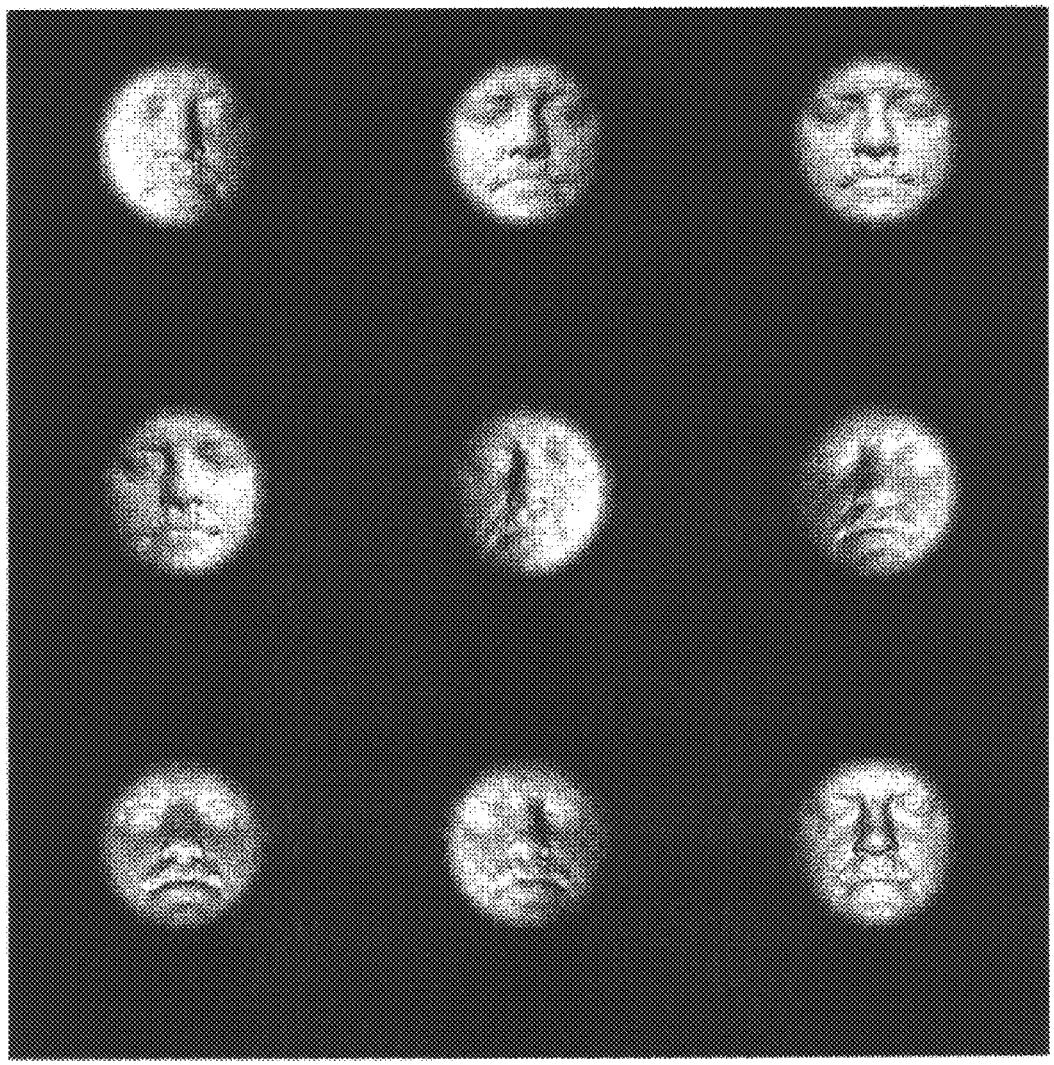
FIG. 8a shows nine masked rendered images of faces of the facial range image shown in FIG. 3.
Figure 8B:
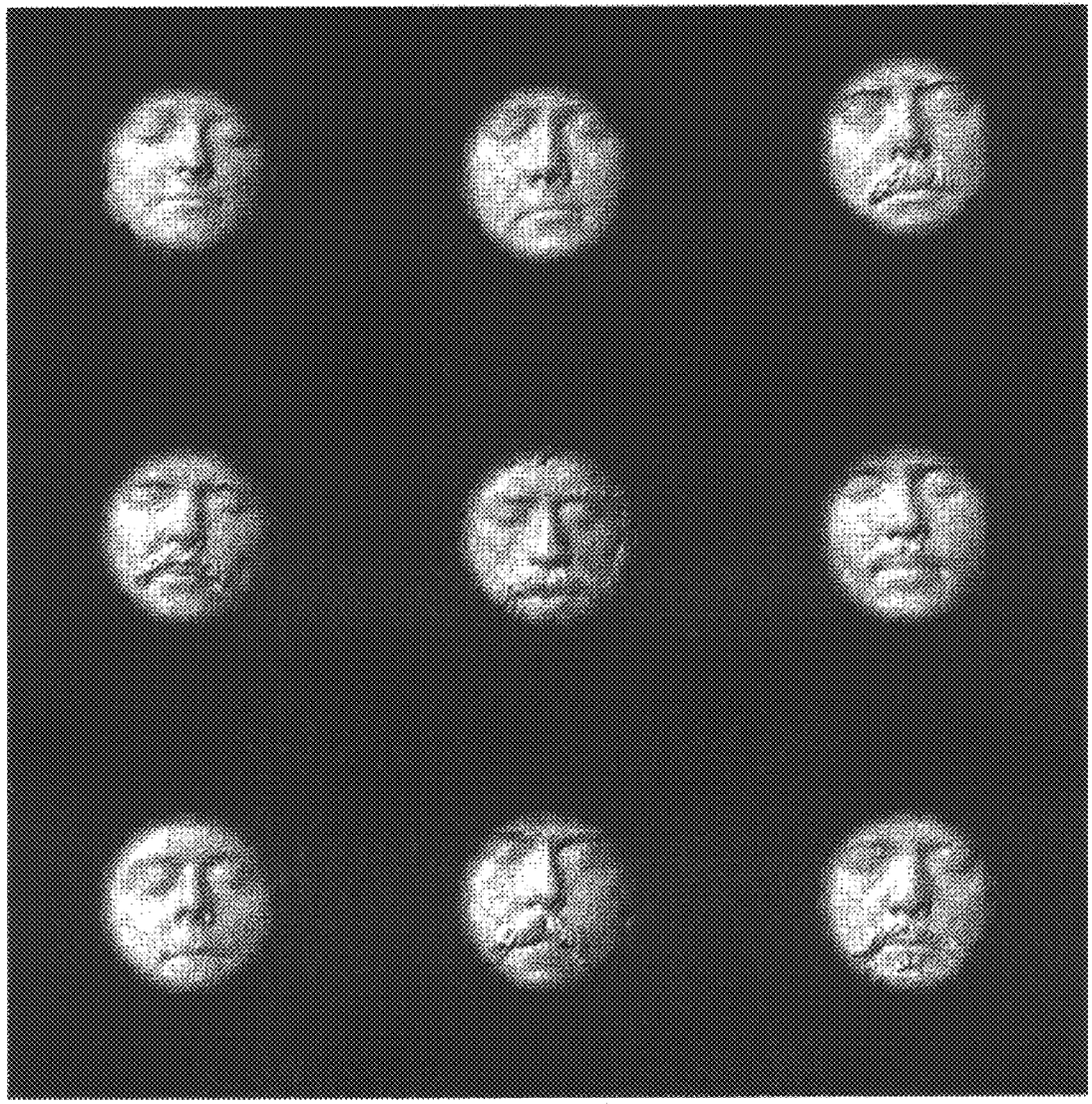
FIG. 8b shows nine masked rendered images of faces shown in FIG. 6.
Figure 9:
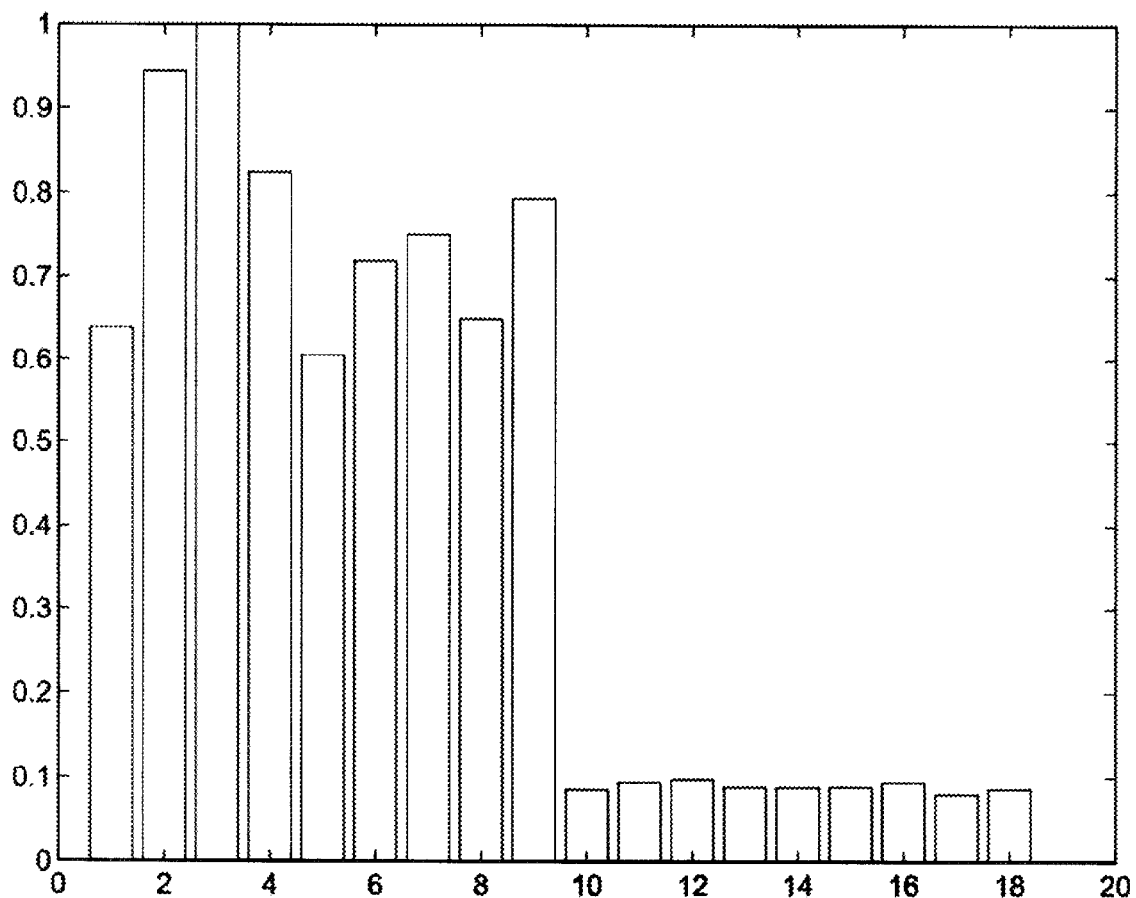
FIG. 9 shows a bar graph of intensities of vector-correlation between a reference facial range image (FIG. 1, top- left) and masked rendered images of faces shown in FIGS. 8a (numbered 1–9 in this figure) and 8b (numbered 10–18 in this figure)

In an embodiment, an effect of outline-contour of a face on a process of recognition is reduced. The input images are masked by a circle with a fuzzy edge; masked images are shown in FIGS. 8a and 8b. The vector-filter is a same filter as that used in the previously described example. A bar-graph of intensities of the correlations is shown in FIG. 9. Again, it is evident that resulting correlations are made substantially illumination independent by selection of a threshold value.

Figure 10:
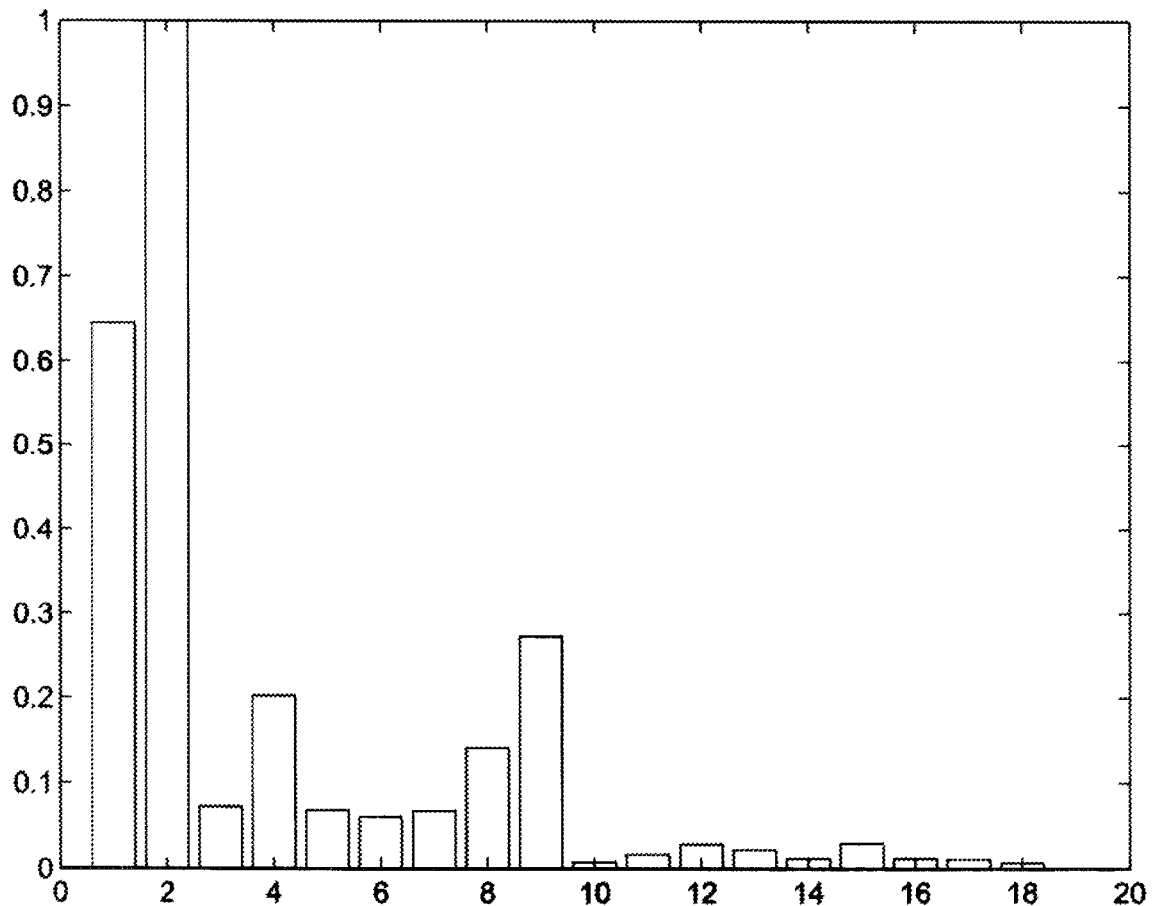
FIG. 10 shows a bar graph of intensities of phase-only correlation between a reference rendered image of a face (FIG. 3, top-middle) and rendered images of faces shown in FIG. 3 (numbered 1–9 in 9 this figure), FIG. 6 (numbered 10–18)

For comparison, a further test was performed including a set of correlations with a traditional phase-only filter as is commonly employed in the art. The reference image is the rendered image shown in FIG. 3 top-middle. A traditional phase-only filter was designed from the reference image in dependence thereon. Correlations between the reference image and the 18 rendered images of faces shown in FIGS. 3 and 6 were performed and resulting intensities are illustrated in a bar-graph shown in FIG. 10.

The above noted results indicate that a phase-only filter is very sensitive to changes of illumination. Improper illumination results in incorrect classification.

Figure 11A:
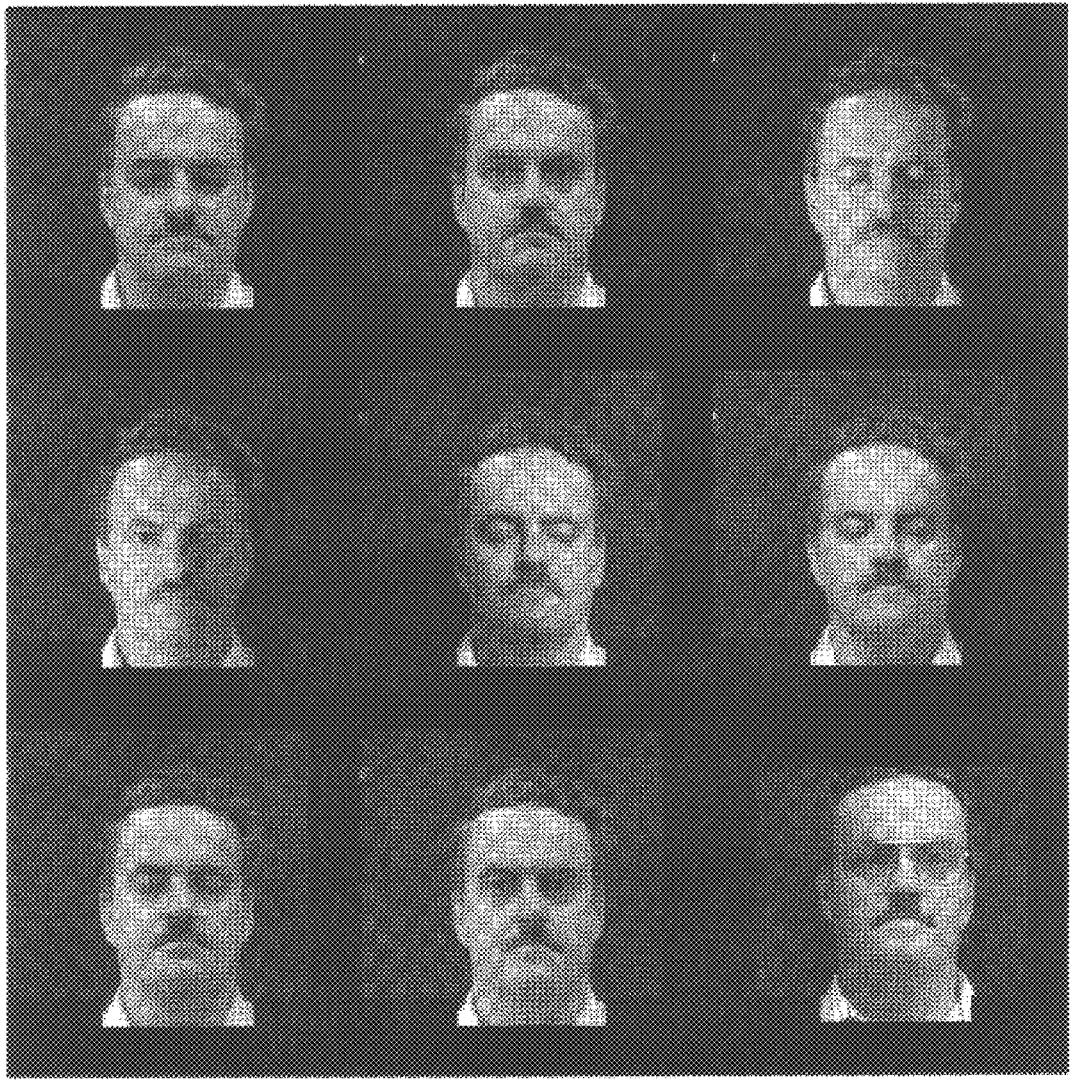
FIG. 11a shown nine two-dimensional intensity images in the form of photographs of a same person.

4.3 Phase-Only Vector Correlation Between a Facial Range Image and Intensity Images of Faces FIG. 11a shows nine intensity images of faces each having different illumination. The images are captured images of a same person's face which is also the same person's face as the facial range image shown in FIG. 2; however, the facial range image was captured approximately 10 years before the intensity images of the face were captured. Note that in the bottom-right image shown in FIG. 11a, the subject is wearing glasses.

Figure 11B:
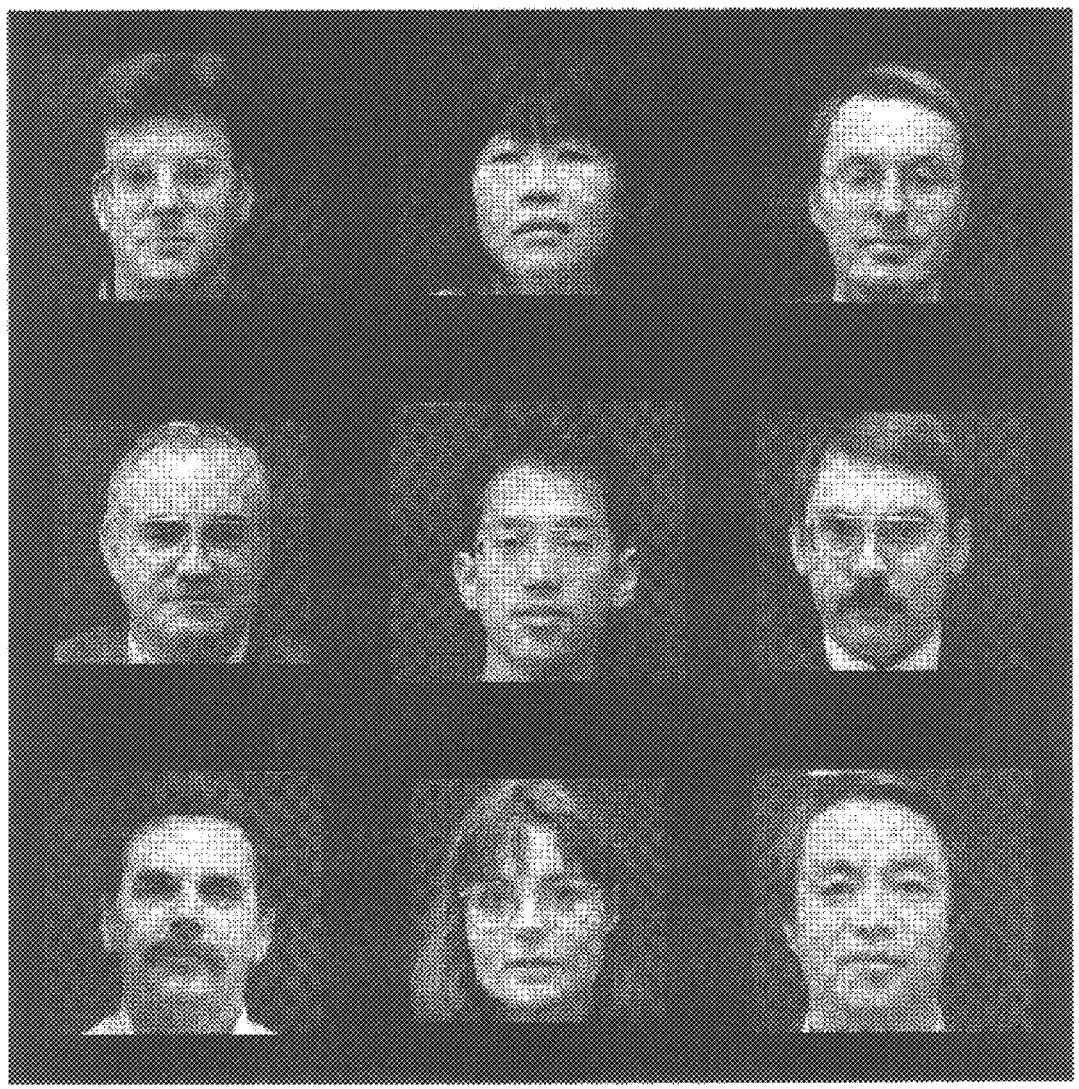
FIG. 11b shown nine two-dimensional intensity images in the form of photographs of different people.
Figure 12:
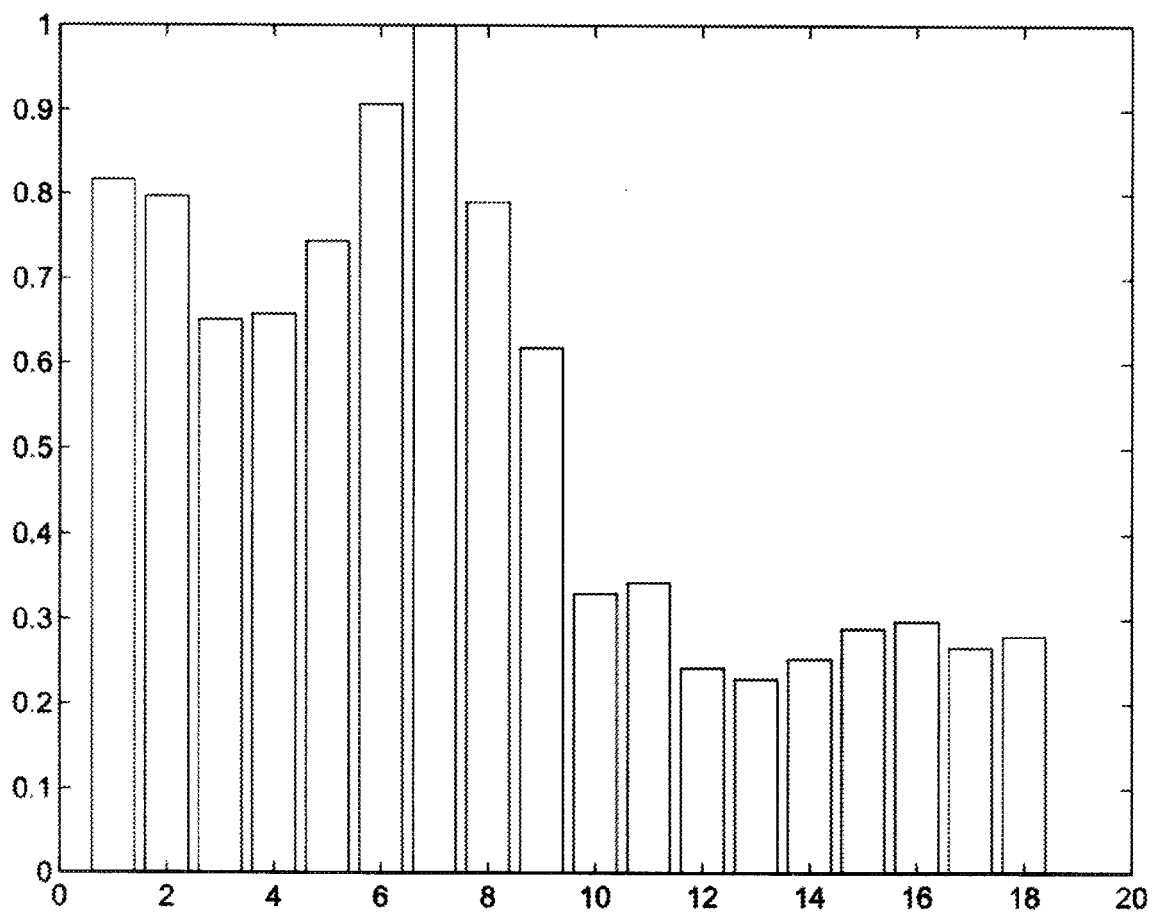
FIG. 12 shown a bar graph of intensities of vector-correlation between the reference facial range image shown in FIG. 1 top-left and the intensity images of faces shown in FIG. 11a (numbered 1–9 in this figure) and FIG. 11b (numbered 10–18 in this figure)

FIG. 11b shows another 9 intensity images of faces. A vector filter derived from the facial range image is used to perform vector correlation between those images of FIG. 11a and those images of FIG. 11b. The intensity values of vector correlation are illustrated in a bar-graph in FIG. 12. A correct classification is obtained by setting an appropriate threshold between cross correlation results and autocorrelation results. The results obtained are not as good as those shown in FIG. 7, probably due to intrinsic color of the face—for example those of hair, pupils, beard and slight differences in shape, scale, and orientation.

Figure 13:
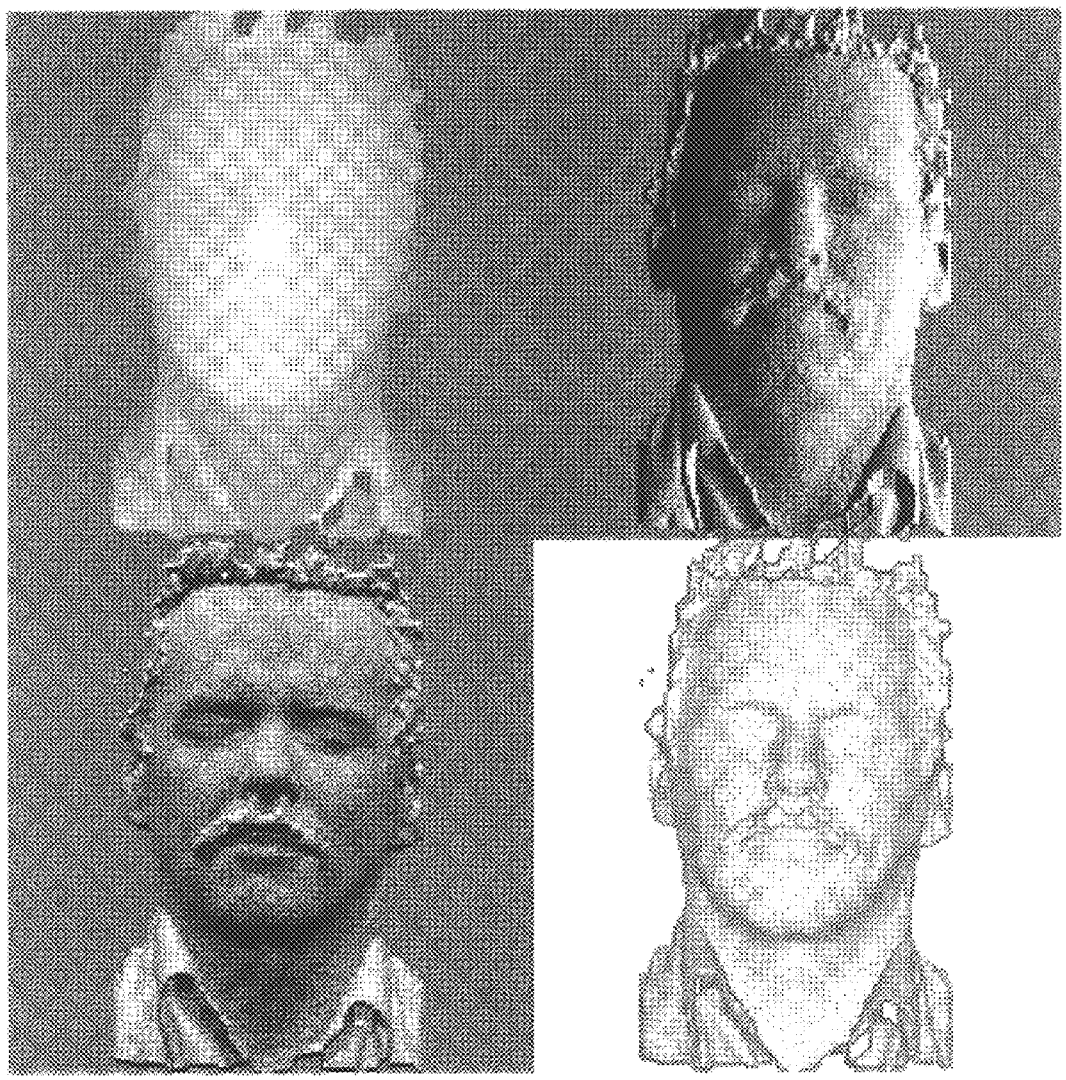
FIG. 13 shows a facial range image in the top-left and its three normal components—a component parallel to an x axis (top-right); a component parallel to an y axis (bottom-left); a component parallel to an z axis (bottom-right)
Figure 14:
FIG. 14 shown nine two-dimensional intensity images of faces in the form of photographs.
Figure 15:
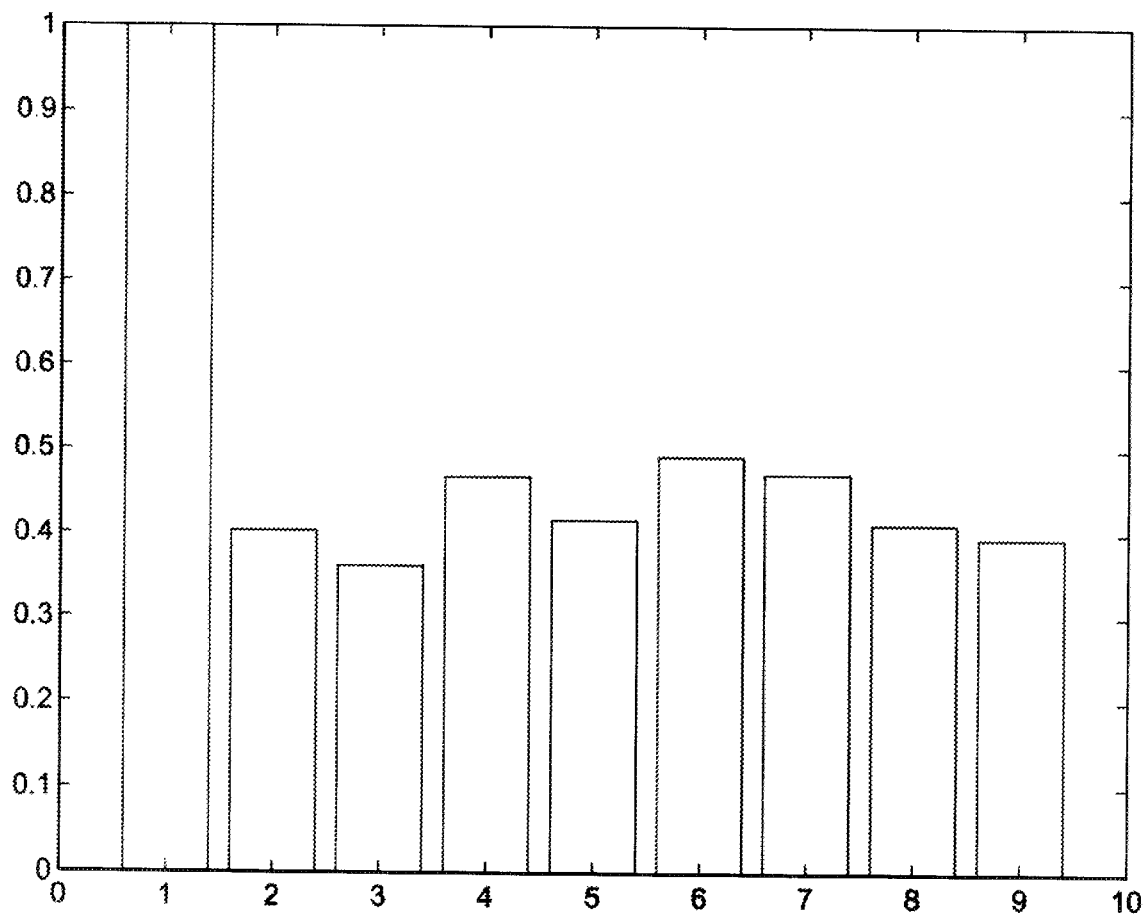
FIG. 15 shows a bar graph of intensities of vector-correlation between the facial range image shown in FIG. 4 centre and the intensity images of faces shown in FIG. 14.

FIGS. 13 and 14 show images used in another example of face recognition. The reference facial range image shown in FIG. 13 is a same image as that shown in FIG. 4 left-middle, which was taken 10 years ago. The vector correlation between the reference and intensity images of faces shown in FIG. 14 are illustrated in a bar-graph of FIG. 15. Again, cross correlation results are significantly lower than autocorrelation results.

Preferably, an input intensity image of a face is scaled to fit the reference range image of a face. Otherwise, a significant correlation peak may not result. Also preferably, orientation of the input image of a face is a same orientation as that of the reference facial range image.

Figure 16:
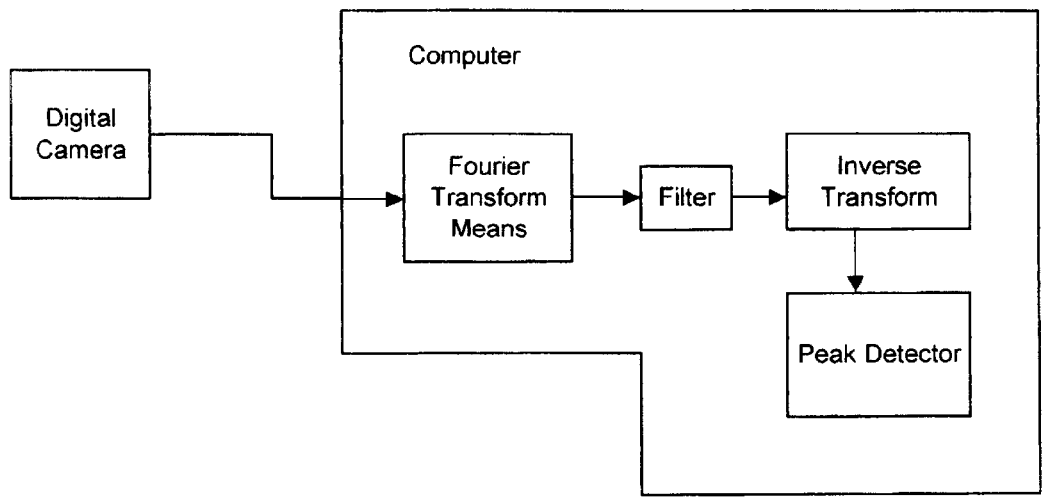
FIG. 16 shows a simplified block diagram of a system for implementing a method according to the invention; and, FIG. 17 shows a simplified block diagram of an optical system for implementing a method according to the invention.

Referring to FIG. 16, a system for carrying out a method according to the invention is shown. An image capture means in the form of a digital camera is coupled to a computer. The computer receives a digital representation of a captured image and performs a transform in the form of a Fourier transform, a joint transform, a binary transform, or another similar transform thereon. The transformed image is then filtered using a filter derived from and associated with a three-dimensional image in the form of a range image. The filter is a phase-only filter. The inverse to the applied transform is applied to the filtered transformed image to produce a correlation result. The correlation result is in the form of a sharp peak when two images are of a substantially same face and of a smaller peak or of no peak when the images are of different faces. When a sharp peak does not result, a new filter is applied followed by another inverse of the applied transform. This process is repeated until all filters are exhausted or until a sharp peak having predetermined characteristics results. When all filters are exhausted, the process ends providing a set of three-dimensional images or associated identities that resulted in sharp peaks. Preferably, the image capture means is for capturing a two-dimensional intensity image of a face wherein the face has a substantially standard scale and orientation.

Figure 17:
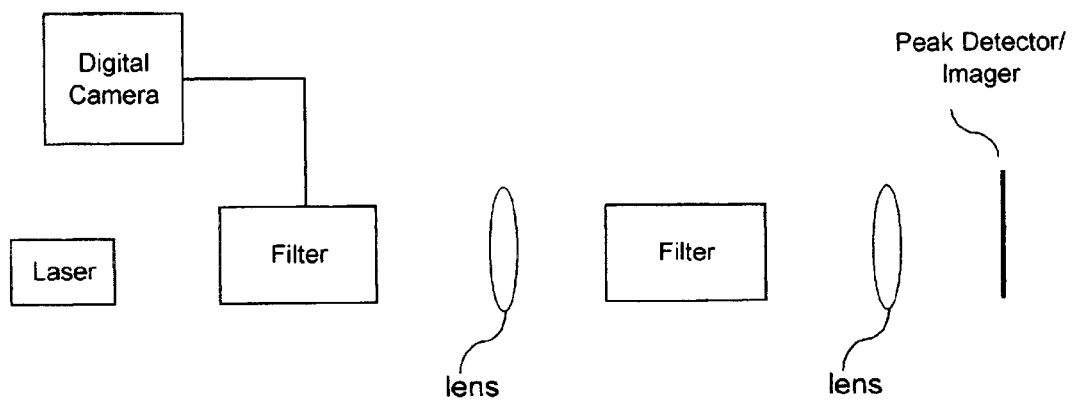

Referring to FIG. 17, an alternative system for carrying out the invention is shown. The system of FIG. 17, is less versatile yet far more efficient. Optical transforms are used instead of digitally calculated transforms. This significantly increases the speed of the inverse transform which must be applied for each phase-only filter. A two-dimensional intensity image capture means in the form of a digital camera is coupled to a first filter. The first filter is for filtering monochromatic light provided by a laser to form substantially the image. The image is projected onto a lens for transforming the image. Lenses for performing transformations such as Fourier transforms are well known in the art of optical computing. For example, a lens is disclosed in U.S. Pat. No. 5,668,647 to Nuss and issued Sep. 16, 1997, U.S. Pat. No. 5,661,747 to Hiiro and issued Aug. 26, 1997, and in U.S. Pat. No. 5,627,678 to Nishii, et. al. and issued May 6, 1997. The transformed image is passed through a second filter. The second filter is determined from a three-dimensional facial image according to the method herein disclosed. The use of an spatial light modulator (SLM) which allows a digital signal to dynamically configure an optical filter, allows for a computer to control optical filtering. The filtered transformed image is then passed through another lens and transformed yet again. Preferably the second transform is substantially the inverse of the first transform. The resulting image represents a correlation result. When the resulting image is a substantially sharp peak, a match is likely.

The use of an SLM in providing the second filter allows for each of a plurality of filters to be applied to a same transformed image without having to move and align physical filters. The SLM receives filter related information form a computer in which different filter configurations are stored. These filter configurations are associated with a three-dimensional image or an identity of an individual. In traversing a database of individuals, filters associated with individuals are applied one at a time to the SLM to filter the optical signal. When a sharp peak results, the face is identified.

In an alternative embodiment for more robust analysis, all filters are applied one at a time and information associated with each resulting peak is stored, and a second more precise stage of recognition is applied to a reduced set of images. For example, when less than 10 identifications result, a human operator reviews the results to eliminate clearly erroneous identifications.

Though the above systems are described using a Fourier transform, other transforms are also applicable to the invention. For example, a binary transform or a joint transform also function in accordance with the invention to produce high autocorrelation results and therefore provide similar advantages to the exemplary embodiment described herein. A video camera, scanner or another intensity image capture means may be employed in place of the digital camera.

Numerous other embodiments may be envisaged without departing from the spirit and scope of the invention.

What is claimed is:

1. A method of comparing a three-dimensional facial image with a two-dimensional intensity image of a face comprising the steps of:

providing a filter having three orthogonal components derived from a plurality of normal vectors derived from points defining the surface of the three-dimensional facial image;

performing a correlation by the steps of providing a transform of at least one of the two-dimensional intensity image other than a transform of the intensity image into a three-dimensional image and filtering the provided transform using the filter derived from three-dimensional facial image to obtain correlation results which are partially independent of the angle from which a face within the two-dimensional intensity image is illuminated; and, when the correlation results are within a first range, providing a signal indicative of a match.

2. A method of comparing a three-dimensional facial image with a two-dimensional intensity image of a face as defined in claim 1 wherein the correlation results are substantially independent of angle of illumination of a face within the two dimensional intensity image.

3. A method of comparing a three-dimensional facial image with a two-dimensional intensity image of a face as defined in claim 1 wherein the step of performing a correlation comprises the steps of transforming the two-dimensional intensity image before filtering the provided transform, and transforming the filtered transformed two-dimensional intensity image to produce the correlation result.

4. A method of comparing a three-dimensional facial image with a two-dimensional intensity image of a face as defined in claim 3 wherein the filter comprises a phase-only filter determined based on the three-dimensional image.

5. A method of comparing a three-dimensional facial image with a two-dimensional intensity image of a face as defined in claim 4 wherein the two-dimensional intensity image is transformed according to one of a Fourier transform, binary transform, and non-linear joint transform and the filtered transformed two-dimensional intensity image is transformed according to an inverse of said transform.

6. A method of comparing a three-dimensional facial image with a two-dimensional intensity image of a face as defined in claim 5 comprising the step of repeating the step of performing a correlation for each of a plurality of different three-dimensional images.

7. A method of comparing a three-dimensional facial image with a two-dimensional intensity image of a face as defined in claim 1 wherein the two-dimensional intensity image is transformed according to one of a Fourier transform, binary transform, and non-linear joint transform.

8. A method of comparing a three-dimensional facial image with a two-dimensional intensity image of a face as defined in claim 1 wherein the two-dimensional intensity image comprises pixels, the method comprising the step of normalising pixels within the two-dimensional intensity image.

9. A method of comparing a three-dimensional facial image with a two-dimensional intensity image of a face as defined in claim 1 wherein the correlation is performed substantially according to the following function:

$$|c|^2 \cong \iota_x^2 |p_x(x,y) \otimes f'_x|^2 + \iota_y^2 |p_y(x,y) \otimes f'_y|^2 + \iota_z^2 |p_z(x,y) \otimes f'_z|^2.$$

10. A system for performing facial recognition comprising:
   means for providing a two-dimensional intensity image of a face;
   means for transforming the intensity image in a predetermined fashion other than a transform of the intensity image into a three-dimensional image;
   means for filtering the transformed intensity image with a filter having three orthogonal components derived from a plurality of normal vectors derived from points defining the surface of a face within a known three-dimensional image for producing a filtered transform image that is substantially independent of an angle of illumination of a face within the two-dimensional intensity image;
   means for transforming the filtered transformed intensity image to produce a result indicative of a correlation between he provided intensity image of a face and the known three-dimensional image.

11. A system for performing facial recognition according to claim 10 wherein the means for transforming the intensity image comprises means for one of Fourier transform, binary transform, and non-linear joint transform.

12. A system for performing facial recognition according to claim 10 wherein the means for transforming the filtered transformed intensity image comprises means for performing substantially the inverse transform to that performed by the means for transforming the image.

13. A system for performing facial recognition according to claim 10 wherein the means for transforming the intensity image comprises Fourier transform means and wherein the means for transforming the filtered transformed intensity image comprises inverse Fourier transform means.

14. A system for performing facial recognition according to claim 13 wherein the means for transforming the intensity image and the means for transforming the filtered transformed intensity image comprise lenses for performing the transforms on an optical signal.

15. A system for performing facial recognition according to claim 10 comprising means for determining a phase only filter in dependence upon a known three-dimensional image of a face for use by the means for filtering the transformed image.

16. A system for performing facial recognition as defined in claim 10 wherein the means for providing a two-dimensional intensity image of a face comprises image capture means for capturing a first intensity image and for providing a first signal in dependence upon the captured image; and,
   wherein the means for transforming the intensity image, the means for filtering the transformed intensity image, and the means for transforming the filtered transformed intensity image comprise at least a processor for receiving the first signal and for applying a transform to the first signal to provide a transformed first signal, for filtering the transformed first signal, the filter determined in dependence upon a three-dimensional image of a face and for applying an inverse of the transform to the filtered transformed first signal.

17. A system for performing facial recognition as defined in claim 10 comprising
   a light source for providing a beam of light;
   a filter for filtering the beam of light, the filter for receiving a first signal and for filtering in dependence thereon, and
   wherein the means for providing a two-dimensional intensity image of a face comprises
   image capture means for capturing a first intensity image and for providing the first signal in dependence thereon;
   wherein the means for transforming the intensity image in a predetermined fashion comprises a lens for receiving the filtered beam of light and for transforming the beam of light in a predetermined fashion;
   wherein the means for filtering the transformed intensity image in dependence upon a known three-dimensional image comprises a second filter for filtering the beam of light,
   the second filter for receiving a second signal in dependence upon a known three-dimensional image and for filtering in dependence thereon; and,
   wherein the means for transforming the filtered transformed intensity image to produce a result indicative of a correlation between the provided intensity image of a face and the known three-dimensional image comprises a lens for receiving the filtered transformed beam of light and for transforming the beam of light in substantially an inverse fashion to the predetermined fashion.

18. A system for performing facial recognition as defined in claim 17 wherein the second filter comprises a spatial light modulator.

19. A system for performing facial recognition as defined in claim 10 wherein the means for providing a two-dimensional intensity image of a face consists of a single two dimensional intensity image capture means.

20. A method of comparing a three-dimensional facial image with a two-dimensional intensity image of a face comprising the steps of:
   providing information derived from the three-dimensional facial image;
   extracting three orthogonal images from the three-dimensional image, the orthogonal images based on orthogonal components of vectors normal to the surface of the three-dimensional image;

performing a correlation of a transform of the two-dimensional intensity image and extracted orthogonal images to obtain correlation results which are partially independent of the angle from which a face within the two-dimensional intensity image is illuminated; and, when the correlation results are within a first range, providing a signal indicative of a match.

21. A method of comparing a three-dimensional facial image with a two-dimensional intensity image of a face as defined in claim 20 wherein the three orthogonal images are used to define a phase-only filter according to $$P=P_x(x,y)i+P_y(x,y)j+P_z(x,y)k.$$

* * * * *